C. H. MELLOR & M. L. ORUM.

Rotary-Cutters.

No. 8,265. Reissued May 28, 1878.

Witnesses:

E. Hittstand

Geo. A. Vaillant.

Inventors.

Chas. H. Mellor.

Morris L. Orum, by J. Snowden Bell,

Atty.

N. PETERS, PHOTO-LITHOGRAPHER, WASHINGTON, D. C.

UNITED STATES PATENT OFFICE.

CHARLES H. MELLOR AND MORRIS L. ORUM, OF PHILADELPHIA, PA.

IMPROVEMENT IN ROTARY CUTTERS.

Specification forming part of Letters Patent No. 140,938, dated July 15, 1873; Reissue No. 8,265, dated May 28, 1878; application filed December 3, 1877.

*To all whom it may concern:*

Be it known that we, CHARLES H. MELLOR and MORRIS L. ORUM, both of the city and county of Philadelphia, in the State of Pennsylvania, have invented certain new and useful Improvements in Rotary Cutters, of which the following is a specification:

Our invention relates to improvements in what are known as "rotary molding-cutters;" and the object of our invention is to provide a cutter which shall be capable of operating on different kinds of work, to wit, either surface-work or paneling or edge-work; to which ends our improvements consist in a cutter having side cutting-arms extending outward from its stock or spindle, with a clear open space between them, and a central socket, which is suited to receive either an end-cutting bit or a guide-pin, one or the other of which is secured in said socket, according as the cutter is to be used for surface or for edge work, as hereinafter more fully set forth.

Figure 1:
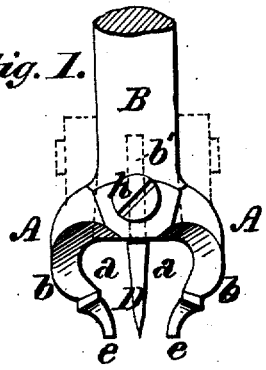
Figure 2:
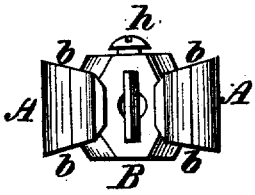
Figure 3:
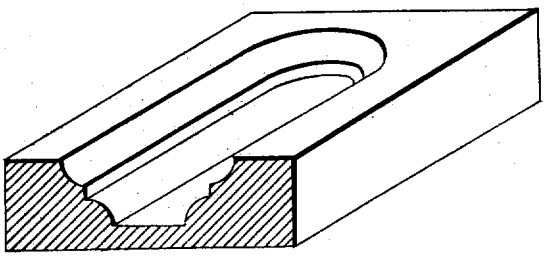
Figure 4:
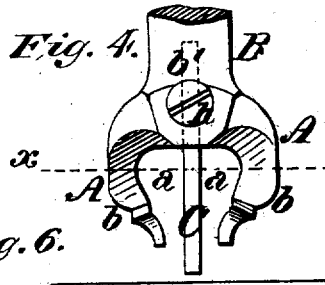
Figure 5:
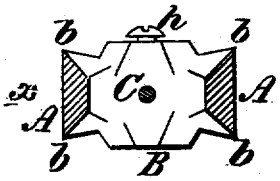

In the accompanying drawings, Figure 1 is a side view, in elevation, of a cutter embodying our improvements as arranged to perform surface or panel work; Fig. 2, an end view of the same; Fig. 3, a section, in perspective, of a panel as cut by the cutter when so arranged; Fig. 4, a side view, in elevation, of the same cutter as arranged to perform edge work; Fig. 5, a transverse section of the same at the line *x x* of Fig. 4; and Fig. 6, a section, in perspective, showing the character of the work done by the cutter when so arranged.

The cutter illustrated in the drawings has two arms, A A, extended outward from the end of the stock or spindle B to form a clear open space, *a*, at the center of the cutter, between the said arms and beyond the spindle, through which ready access may be obtained to the side-cutting edges *b b* of the arms A A, for the purpose of sharpening the same, and which will afford ample clearance for the cuttings and prevent the clogging of the tool.

A central socket, *b'*, is formed in the stock or spindle B of the cutter, the diameter and depth of said socket being such as to suit it to receive either an end-cutting bit D, or a guide-pin, C, one or the other of which, respectively, is inserted in the socket *b'*, and secured therein by a set-screw, *h*, according as the cutter is to be used for surface or for edge work.

The cutter, as fitted with the detachable end-cutting center-bit D, is used for surface or panel work of the character illustrated in the sectional perspective view, Fig. 3, and when so used the bit D bores into the wood to start the cut, and the side-cutting edges *b b* of the arms A A continue and complete the cut, at first downward, and afterward longitudinally.

The ends *e e* of the arms A A are blunt, to prevent shortening of the tool; and the bit D is capable of longitudinal adjustment, so that it may be set outward as it wears, and project slightly beyond the ends of the arms A.

By reference to Fig. 2 it will be seen that the end-cutting edge of the bit D is made slightly longer than the ends of the arms A A, so that in exerting its boring action in the downward cut at the commencement of the operation it entirely removes the core of wood which would otherwise remain in the open space between the arms.

Figure 6:
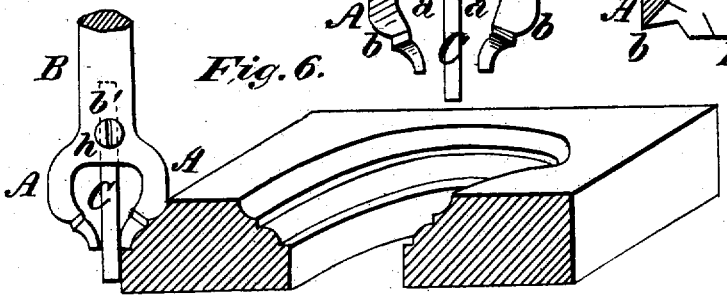

To render our improved cutter available for edge-work—that is, work of the class represented in Fig. 6—a guide-pin, C, is inserted and secured in the socket *b'* by the set-screw *h* in lieu of the bit D. The pin C serves as a guide for the block or piece of wood in its longitudinal movement; and it is obvious that in this operation the side-cutting action of the edges *b* of the arms A A is alone necessary, as no boring or downward cut is required.

In constructing our improved tool, the arms A A (of which there may be more than two) may be made in one piece with, or be simply secured to, the spindle.

We are aware that the employment of a projecting central pin as a guide upon a rotary cutter is not new, one form of such device being shown in the Letters Patent of D. Jordan, No. 103,890, June 7, 1870, and we do not therefore broadly claim such device. In the instance referred to, however, the construction of the guide-pin, and its combination with the cutting-blades, is such as to preclude the employment of the cutter, of which it forms part, on surface or panel work. Moreover, so far as our knowledge and information extend, rotary cutters have not, prior to our invention, been so constructed as to have the adaptability which our construction provides for use upon either surface or edge work.

We claim as our invention and desire to secure by Letters Patent—

1. A rotary cutter having side-cutting arms extended outward from the end of its spindle, with an intermediate clear, open space, and a central socket in the spindle suited to receive either an end-cutting bit or a guide-pin, so that the cutter may be operated either on surface or edge work, substantially as set forth.

2. The combination, in a rotary cutter, of a stock or spindle, side-cutting arms extended outward from the end thereof, with an open space between said arms beyond the end of the spindle, and an end-cutting bit or a guide-pin secured in a central socket in the end of the spindle, these members being combined for joint operation on surface-work, substantially as set forth.

C. H. MELLOR.
MORRIS L. ORUM.

Witnesses:
J. SNOWDEN BELL,
T. T. LEWIS.